(12) United States Patent
Kim

(10) Patent No.: US 8,815,439 B2
(45) Date of Patent: Aug. 26, 2014

(54) SECONDARY BATTERY PACK

(75) Inventor: Hyeon-Young Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 126 days.

(21) Appl. No.: 13/009,651

(22) Filed: Jan. 19, 2011

(65) Prior Publication Data

US 2011/0250473 A1 Oct. 13, 2011

Related U.S. Application Data

(60) Provisional application No. 61/323,707, filed on Apr. 13, 2010.

(51) Int. Cl.
*H01M 2/02* (2006.01)
*H01M 6/08* (2006.01)

(52) U.S. Cl.
USPC ............... 429/179; 429/178; 429/164

(58) Field of Classification Search
None
See application file for complete search history.

(56) References Cited

U.S. PATENT DOCUMENTS

| | | | | |
|---|---|---|---|---|
| 3,623,916 A | * | 11/1971 | Toyooka | 429/120 |
| 6,010,804 A | * | 1/2000 | Barksdale | 429/178 |
| 2004/0240187 A1 | | 12/2004 | Takabatake et al. | |
| 2007/0152631 A1 | * | 7/2007 | Seo | 320/112 |
| 2007/0188984 A1 | | 8/2007 | Opsitos, Jr. | |
| 2007/0202364 A1 | | 8/2007 | Uh et al. | |

FOREIGN PATENT DOCUMENTS

| | | |
|---|---|---|
| CN | 1992413 A | 7/2007 |
| JP | 2002-359447 | 12/2002 |
| JP | 2005-129260 | 5/2005 |
| JP | 2007-234586 | 9/2007 |
| KR | 10-2009 0095954 | 9/2009 |
| KR | 10-2010 0012053 | 1/2010 |

OTHER PUBLICATIONS

EP Search Report dated Aug. 4, 2011 for corresponding EP Application No. 11158106.2.
Registration Determination Certificate dated Feb. 21, 2013 for corresponding KR Application No. 10-2011-0019885.
First Office Action dated May 27, 2014 for Chinese Patent Application No. CN 201110091511.5 which claims priority from U.S. Appl. No. 61/323,707, filed Apr. 13, 2010, and captioned U.S. Appl. No. 13/009,651.

* cited by examiner

*Primary Examiner* — Cynthia K. Walls
(74) *Attorney, Agent, or Firm* — Knobbe, Martens, Olson & Bear, LLP

(57) ABSTRACT

A second battery pack is provided. Since a plurality of wires electrically connected to the output terminals of a PCB are installed surrounding at least a part of the PCB, the tensile strength of the wires may be improved.

10 Claims, 5 Drawing Sheets

SECONDARY BATTERY PACK

RELATED APPLICATIONS

This application claims the benefit of U.S. Provisional Application No. 61/323,707, filed Apr. 13, 2010 entitled SECONDARY BATTERY PACK which is hereby incorporated in its entirety.

BACKGROUND

1. Field

One or more embodiments of the present invention relate to a secondary battery pack in which wires may be easily connected to a protection circuit module (PCM) assembly.

2. Description of the Related Art

Secondary batteries are chargeable and dischargeable unlike primary batteries. The secondary battery is used as an energy source for mobile devices such as laptops and cellular phones, electric automobiles, hybrid electric automobiles, electric bicycles, or uninterruptible power supplies. A lithium (Li) ion battery is an example of the secondary battery. The secondary battery may be classified into a cylindrical type, a rectangular type, and a pouch type according to the shape thereof.

To provide safety for the secondary battery, a protection circuit module (PCM) is electrically connected to a battery cell. In the PCM, an element such as field effect transistor (FET) is mounted on a printed circuit board (PCB). The PCM includes a plurality of output terminals that are connected to an external circuit board.

An end portion of a wire that is electrically connected to the external circuit board is welded to the output terminal of the PCM. Since the end portion of a wire may be easily separated from the output terminal of the PCM, a connection portion needs to have a sufficient tensile strength to resist separation.

SUMMARY

One or more embodiments of the present invention include a secondary battery pack in which wires may be firmly connected to output terminals of a protection circuit module (PCM).

Additional aspects will be set forth in part in the description which follows and, in part, will be apparent from the description, or may be learned by practice of the presented embodiments.

The aforementioned needs are satisfied in one embodiment of the present invention which comprises a battery assembly comprising a battery cell having an electrode assembly and a cap assembly wherein the cap assembly includes a cap plate that defines a first surface. This embodiment further includes second a protection circuit module having a circuit board which defines a first and a surface with a side surface interposed there between and at least one protection device mounted on the circuit board; wherein the protection circuit module is mounted on the battery cell so that the first surface of the circuit board of the protection circuit module is positioned proximate the first surface of the cap plate and wherein the protection circuit module includes at least one external terminal. This embodiment further includes at least one wire that is coupled to the at least one external terminal of the protection circuit module so that at least a portion of the at least one wire is positioned proximate the first surface of the circuit board.

In one embodiment, the first surface of the circuit board is a bottom surface and an end portion of the at least one wire couples to the external terminal the bottom surface of the circuit board.

In one embodiment, the at least one external terminal and the at least one wire comprises a plurality of terminals and a plurality of wires and wherein at least one partition is interposed between adjacent wires.

In one embodiment, the protection circuit module defines an outer edge of the side surface and a recess is formed in the outer edge so that the at least one wire is positioned proximate to the side surface of the circuit board within the recess. In another embodiment, the recess is sized so that the at least one wire is positioned within the recess so as to not extend outward from the outer edge of the side surface.

In one embodiment, the battery assembly further comprises at least one reinforcing block that is interposed between the circuit board of the protection circuit module and the first surface of the battery cell. In one embodiment, the reinforcing block comprises a first reinforcing block that engages the circuit board of the protection circuit module at a position adjacent the location where the at least one wire accesses the external terminal via the first surface of the circuit board of the protection circuit module.

In one embodiment, the battery assembly comprises a second reinforcing block that is interposed between the first surface of the battery cell and the first surface of the circuit board of the protection circuit module wherein the circuit board of the protection circuit module defines a first and second end and the first reinforcing block is positioned adjacent the first end and the second reinforcing block is positioned adjacent the second end.

In one embodiment, at least one opening is formed in the at least one reinforcing block to allow the at least one wire to extend from the side surface of the circuit board toward the external terminal. In one embodiment, the at least one opening and the at least one wire comprises a plurality of openings and a plurality of wires. In one embodiment, the wire is wrapped around the circuit board.

In one embodiment, the portion of the at least one wire that is coupled to the at least one external terminal is coated with a coating material so as to increase the coupling strength between the at least one wire and the at least one external terminal.

In one embodiment, the at least one external terminal comprises a first external terminal that is electrically connected to the positive terminal of the battery cell and a second terminal that is electrically connected to the negative terminal of the battery cell.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
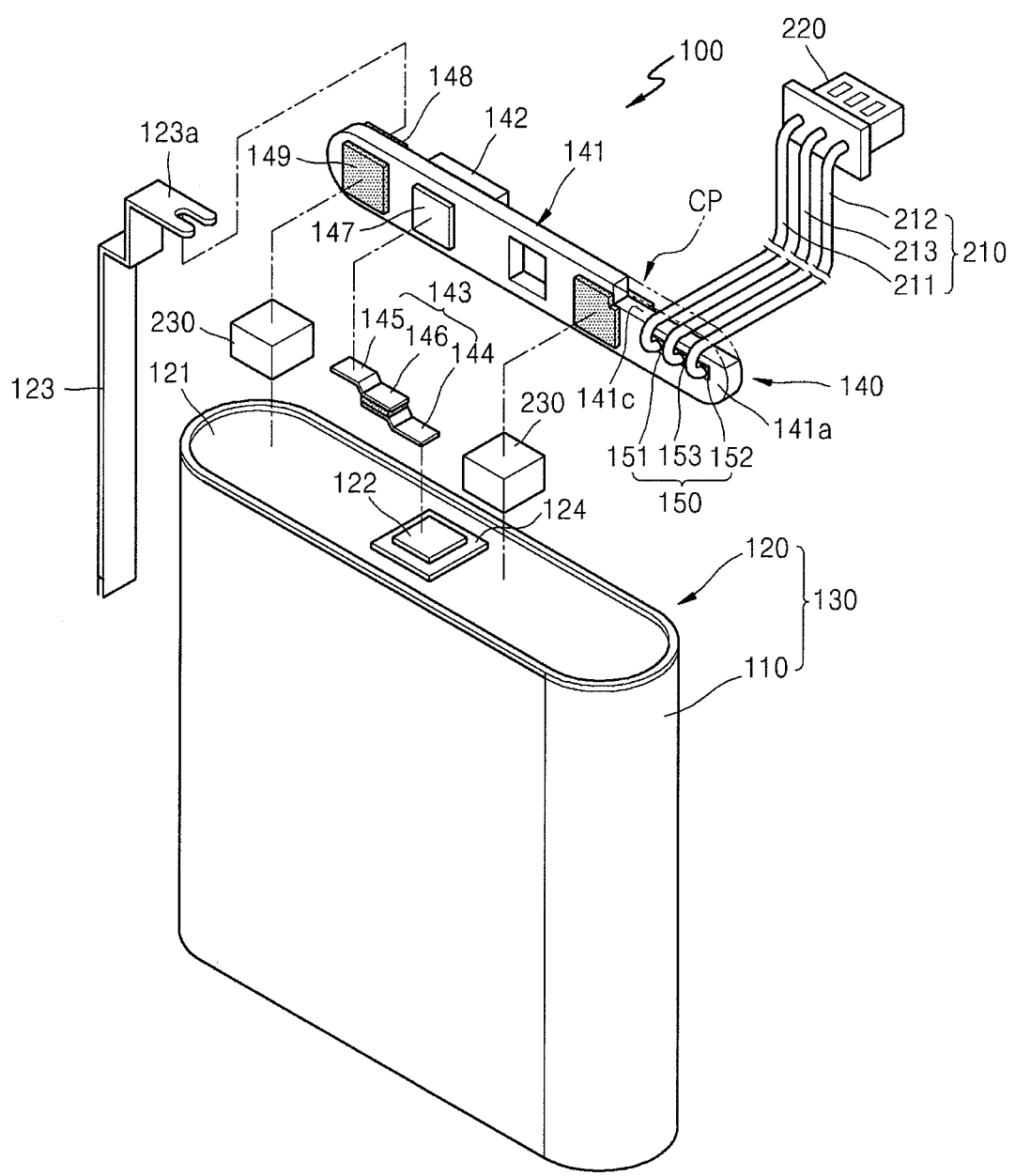
FIG. 1 is an exploded perspective view of a secondary battery pack according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
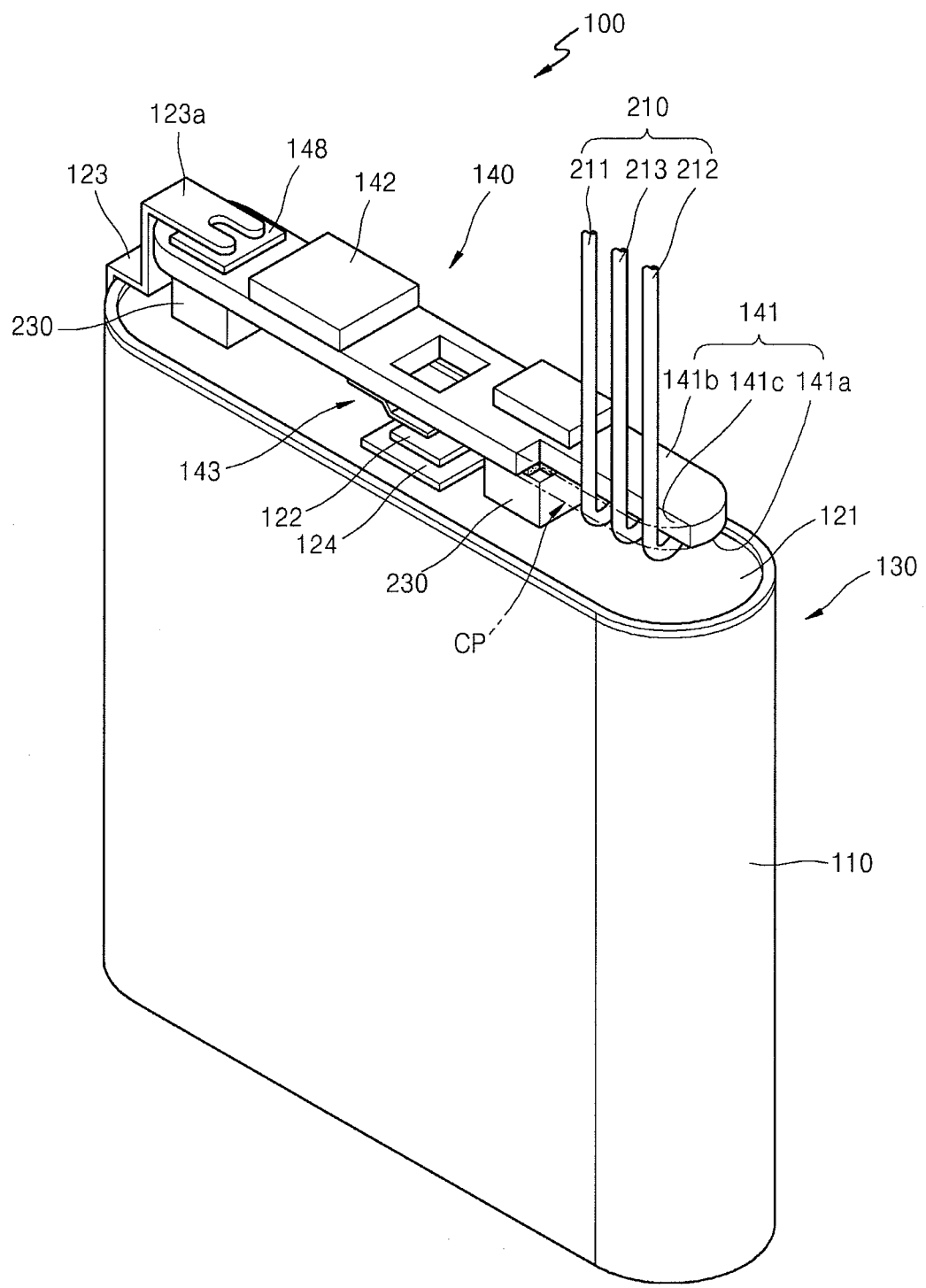
FIG. 2 is a perspective view illustrating the secondary battery pack of FIG. 1 that is assembled.
Figure 3:
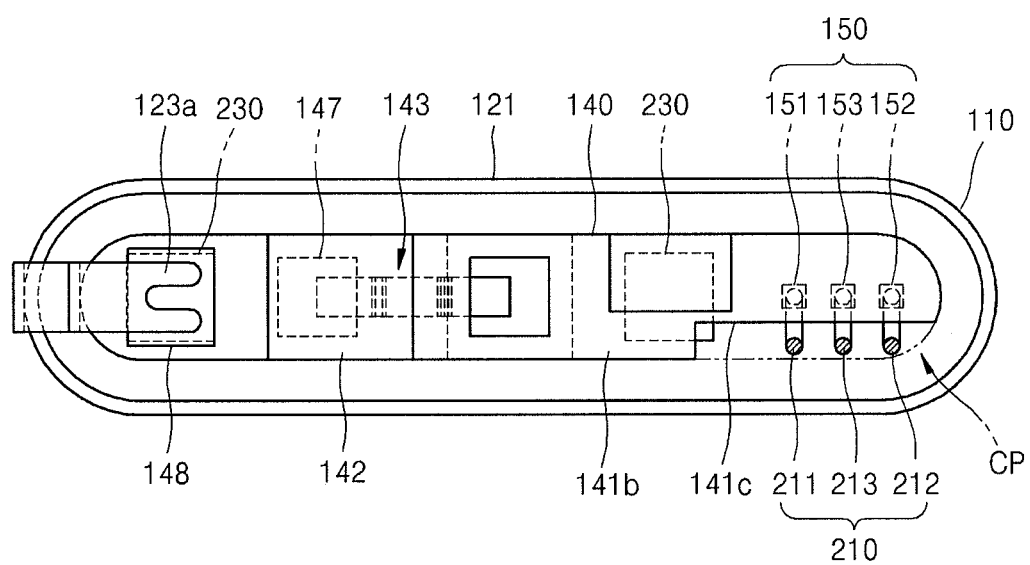
FIG. 3 is a plan view of the secondary battery pack of FIG. 2.

FIG. 1 is an exploded perspective view of a secondary battery pack 100 according to an embodiment of the present invention. FIG. 2 is a perspective view illustrating the secondary battery pack 100 of FIG. 1 that is assembled. FIG. 3 is a plan view of the secondary battery pack of FIG. 2.

Referring to FIGS. 1-3, the secondary battery pack 100 includes a battery cell 130 having a cap assembly 120 and a protection circuit module 140 electrically connected to the battery cell 130. The cap assembly 120 includes a cap plate 121 coupled to an upper end portion of a can 110, an electrode terminal 122 located at the center portion of the cap plate 121, and a lead plate 123 located outside the battery cell 130.

An electrode portion (not shown), in which a positive electrode plate, a separator, and a negative electrode plate are wound in a jelly-roll type, is accommodated in the can 110. The cap plate 121 is welded to the can 110. The electrode terminal 122 is insulatively coupled to the cap plate 121 via an insulation plate 124. The electrode terminal 122 has a first polarity. The lead plate 123 is electrically connected to a part of an outer surface of the can 110 or the cap plate 121. The lead plate 123 has a second polarity that is different from the first polarity. For example, the electrode terminal 122 functions as a negative electrode, whereas the can 110, the cap plate 121, and the lead plate 123, which are electrically connected to one another, function as a positive electrode.

The protection circuit module 140 is installed on the upper portion of the battery cell 130. The protection circuit module 140 includes a printed circuit board (PCB) 141, a plurality of electronic elements 142 mounted on the PCB 141, and a positive temperature coefficient (PTC) element 143 functioning as a safety element.

The PCB 141 has a size large enough to be installed on the cap plate 121. The PCB 141 is a circuit board in which at least one of circuit pattern layers is deposited. The electronic element 142 includes an IC chip, an FET, a resistor, or a capacitor.

The PTC element 143 includes a first connection lead 144, a second connection lead 145, and a PTC main body 146 disposed between the first and second connection leads 144 and 145. The first connection lead 144 is electrically connected to the electrode terminal 122. The second connection lead 145 is electrically connected to the first terminal 147 of the protection circuit module 140. The PTC main body 146 is electrically connected between the first and second connection leads 144 and 145. The lead plate 123 has one end portion 123a that is bent and electrically connected to a second terminal 148 of the protection circuit module 140.

A plurality of wires 210 are connected to a plurality of output terminals 150 of the protection circuit module 140 and simultaneously to an external circuit board. The wires 210 are installed surrounding at least a part of the PCB 141.

In detail, a first output terminal 151, a second output terminal 152, and a third output terminal 153 are formed on a surface 141a of the PCB 141 that faces the battery cell 130. The first output terminal 151 functions as a positive electrode. The second output terminal 152 functions as a negative electrode. The third output terminal 153 measures a current state, for example, a resistance value, of the battery cell 130.

The wires 210 include a first wire 211 connected to the first output terminal 151, a second wire 212 connected to the second output terminal 152, and a third wire 213 connected to the third output terminal 153. End portions of the first, second, and third wires 211, 212, and 213 are respectively welded to the first, second, and third output terminals 151, 152, and 153. The other end portions of the first, second, and third wires 211, 212, and 213 are connected to a connector 220 that is connected to the external circuit board.

The wires 210 are connected to the output terminals 150 on the surface 141a of the PCB 141 that faces the battery cell 130. The wires 210 are drawn toward the other surface 141b of the PCB 141 by passing a side wall 141c of the PCB 141. The other surface 141b of the PCB 141 is opposite to the surface 141a of the PCB 141 that faces the battery cell 130.

The output terminals 150 to which the wires 210 are connected may be coated using a coating member such as silicon so that the tensile strength of the wires 210 may be further improved.

The wires 210 are installed surrounding a part of the PCB 141 and extending upwardly above the other surface 141b of the PCB 141. Thus, compared to the structure of a battery cell in which a plurality of output terminals are arranged on the surface opposite to one surface of a PCB and a plurality of wires are connected to the output terminals, the wires 210 according to the present embodiment that surround a part of the PCB 141 may improve the tensile strength of the wires 210.

Since the wires 210 are located at the side wall 141c of the PCB 141, the volume corresponding to the thickness of the wires 210 is taken. Thus, the secondary battery pack 100 further requires a space for installing the wires 210.

Also, when the wires 210 are installed outside the area where the PCB 141 is installed, interference with other parts of the secondary battery pack 100 may be generated during the assembly of the secondary battery pack 100 so that the wires 210 may be damaged.

To reduce the damage to the wires 210, the wires 210 are installed inside the area where the PCB 141 is installed. That is, the PCB 141 is partially cut away. The wires 210 are positioned within a cut-away area CP of the PCB 141. The shape of the cut-away area CP is not limited to any specific shape only if the wires can be positioned within the area where the PCB 141 is installed.

Since a portion where the wires 210 are connected to the output terminals 150 is located between the battery cell 130 and the protection circuit module 140, a reinforcing block 230 is installed to secure a space for installing the wires 210.

That is, the reinforcing block 230 is located between the upper surface of the cap plate 121 and the surface 141a of the PCB 141 which are arranged to face each other. One surface of the reinforcing block 230 is attached to the surface 141a of the PCB 141 by using a connection member 149 such as double-sided adhesive tape. The other surface of the reinforcing block 230 is located at the upper surface of the cap plate 121. The size of the reinforcing block 230 may be smaller than that of the cap plate 121.

The thickness of the reinforcing block 230 is greater than that of the portion where the wires 210 are connected to the output terminals 150. Accordingly, the portion where the wires 210 are connected to the output terminals 150 may be located between the upper surface of the cap plate 121 and the surface 141a of the PCB 141.

The result of a tensile strength test on the wires performed by the subject applicant is shown in Table 1.

TABLE 1

| Unit (KgF) | Comparative Example | Embodiment |
|---|---|---|
| 1 | 1.02 | 1.74 |
| 2 | 1.11 | 1.66 |
| 3 | 1.13 | 1.72 |
| 4 | 1.04 | 1.65 |
| 5 | 1.21 | 1.78 |
| 6 | 1.03 | 1.71 |
| 7 | 1.16 | 1.61 |
| 8 | 1.25 | 1.59 |
| 9 | 0.98 | 1.75 |
| 10 | 1.06 | 1.84 |
| Ave. Tensile Strength | 1.099 | 1.705 |
| Max. Tensile Strength | 1.25 | 1.84 |
| Min. Tensile Strength | 0.98 | 1.59 |

In Table 1, the comparative example is a case in which the wires do not surround a part of the PCB and simultaneously a post-treatment process using a coating member such as silicon is not performed, whereas the embodiment is a case in which the wires according to the present embodiment surround a part of the PCB. Referring to Table 1, in the comparative example, the average tensile strength, the maximum tensile strength, and the minimum tensile strength of ten (10) wires are respectively 1.099 KgF, 1.25 KgF, and 0.98 KgF. In contrast, in the embodiment, the average tensile strength, the maximum tensile strength, and the minimum tensile strength of ten (10) wires are respectively 1.705 KgF, 1.84 KgF, and 1.59 KgF. As a result, it can be seen that the average tensile strength in the embodiment may be increased by 50% or more, compared to the comparative example, without the post-treatment process using a coating member.

Figure 4:
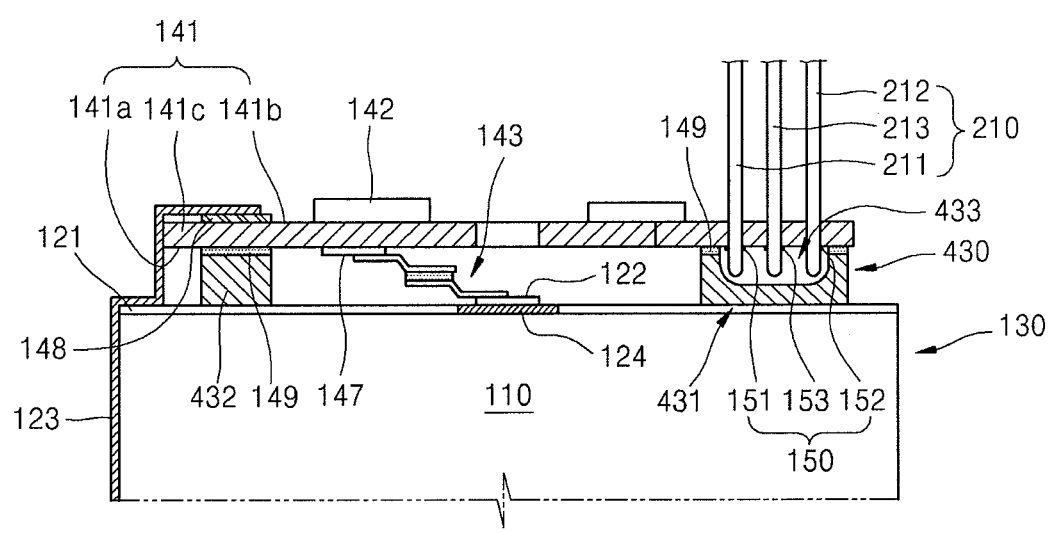
FIG. 4 is a partially cut-away cross-sectional view of a secondary battery pack according to another embodiment of the present invention.

FIG. 4 is a partially cut-away cross-sectional view of a secondary battery pack according to another embodiment of the present invention. In the drawings, like reference numerals refer to the like elements having the same functions. In the following descriptions of the embodiments, each embodiment will be described mainly on its characteristic features.

Referring to FIG. 4, the wires 210 are connected to the output terminals 150 on the surface 141a of the PCB 141 facing the battery cell 130 and then drawn toward the other surface 141b of the PCB 141 by passing the side wall 141c of the PCB 141. Accordingly, while surrounding a part of the PCB 141, the wires 210 are installed extending upwardly above the other surface 141b of the PCB 141.

A plurality of reinforcing blocks 430 are installed between the upper surface of the cap plate 121 and the surface 141a of the PCB 141. The reinforcing blocks 430 include a first reinforcing block 431 and a second reinforcing block 432. However, the number of the reinforcing blocks is not limited thereto and at least one reinforcing block is installed.

The first reinforcing block 431 is located at the portion where the wires 210 are connected to the output terminals 150. An accommodation hole 433 for accommodating the above connection portion is formed in the first reinforcing block 431. In detail, the accommodation hole 433 is formed to a predetermined depth from the surface of the first reinforcing block 431 that faces the surface 141a of the PCB 141 and has a size for accommodating the connection portion. The cross-sectional shape of the accommodation hole 433 is semicircular at the center of the first reinforcing block 431.

Accordingly, the first reinforcing block 431 maintains a predetermined interval between the upper surface of the cap plate 121 and the surface 141a of the PCB 141 and simultaneously may accommodate the portion where the wires 210 are connected to the output terminals 150. The second reinforcing block 432 is located at the opposite side of the portion where the first reinforcing block 431 is installed, but the position of the second reinforcing block 432 is not limited thereto.

The first and second reinforcing blocks 431 and 432 are attached to the surface 141a of the PCB 141 using a double-sided adhesive tape. However, the present invention is not limited thereto and thus the first and second reinforcing blocks 431 and 432 may be attached to the upper surface of the cap plate 121.

Figure 5:
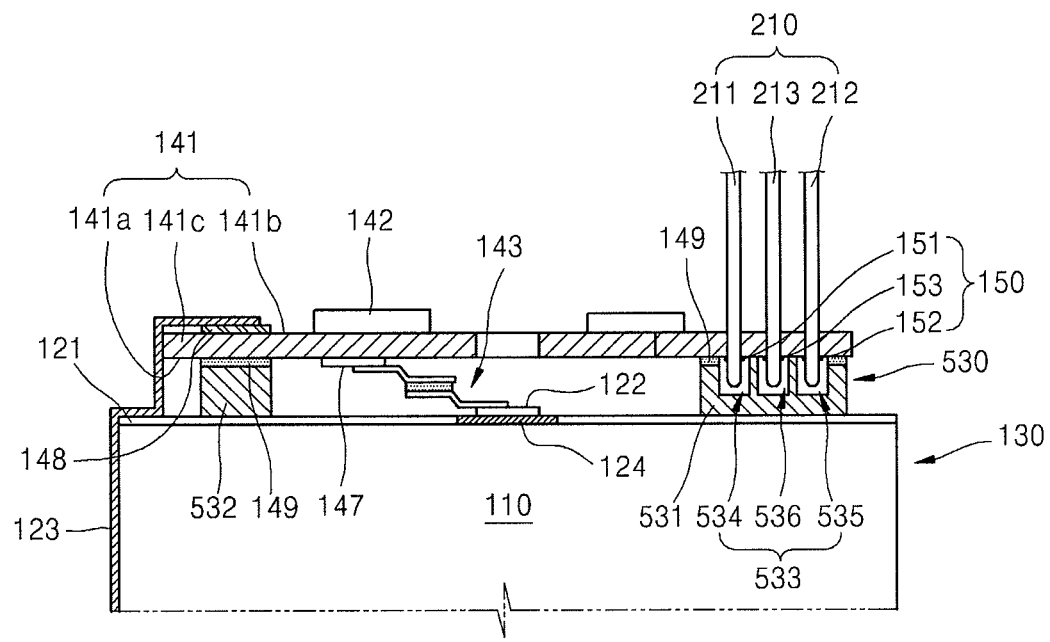
FIG. 5 is a partially cut-away cross-sectional view of a secondary battery pack according to another embodiment of the present invention.

FIG. 5 is a partially cut-away cross-sectional view of a secondary battery pack according to another embodiment of the present invention. Referring to FIG. 5, the wires 210 are connected to the output terminals 150 at the surface 141a of the PCB 141 that faces the battery cell 130 and drawn toward the other surface 141b of the PCB 141 by passing the side wall 141c of the PCB 141. Accordingly, the wires 210 are installed to extend upwardly above the other surface 141b of the PCB 141, surrounding a part of the PCB 141.

A plurality of reinforcing blocks 530 are installed between the upper surface of the cap plate 121 and the surface 141a of the PCB 141. The reinforcing blocks 530 include a first reinforcing block 531 and a second reinforcing block 532.

The first reinforcing block 531 is located at the portion where the wires 210 are connected to the output terminals 150. The first reinforcing block 531 includes a plurality of accommodation holes 533 for accommodating the connection portion. In detail, the accommodation hole 533 is formed to a predetermined depth from the surface of the first reinforcing block 531 that faces the surface 141a of the PCB 141 and has a size for accommodating the connection portion.

Unlike the embodiment of FIG. 4, the first accommodation holes 533 include a first accommodation hole 534 in which the first wire 211 connected to the first output terminal 151 is accommodated, a second accommodation hole 535 in which the second wire 212 connected to the second output terminal 152 is accommodated, and a third accommodation hole 536 in which the third wire 213 connected to the third output terminal 153 is accommodated. The number of the accommodation holes 533 corresponds to the number of the wires 210.

The accommodation holes 533 are arranged to have semicircular cross-sections at the center of the first reinforcing block 531, or in strips from one side to the other side of the first reinforcing block 531, by being separated from one another. The present invention is not limited to the above shapes, and a variety of shapes and arrangements of the accommodation holes 533 may be employed.

Accordingly, the first reinforcing block 531 maintains a predetermined interval between the upper surface of the cap plate 121 and the surface 141a of the PCB 141. Simultaneously, the portion where the wires 210 are connected to the output terminals 150 may be accommodated in the accommodation holes 533. Since the accommodation holes 533 are separated from each other in a multiple number, the portion where the wires 210 are connected to the output terminals 150 may be accommodated in each of the accommodation holes 533. Thus, electric short-circuit between the neighboring wires 210 may be prevented. The second reinforcing block 532 is located at the opposite side of the portion where the first reinforcing block 531 is installed, but the position of the second reinforcing block 532 is not limited thereto.

Figure 6:
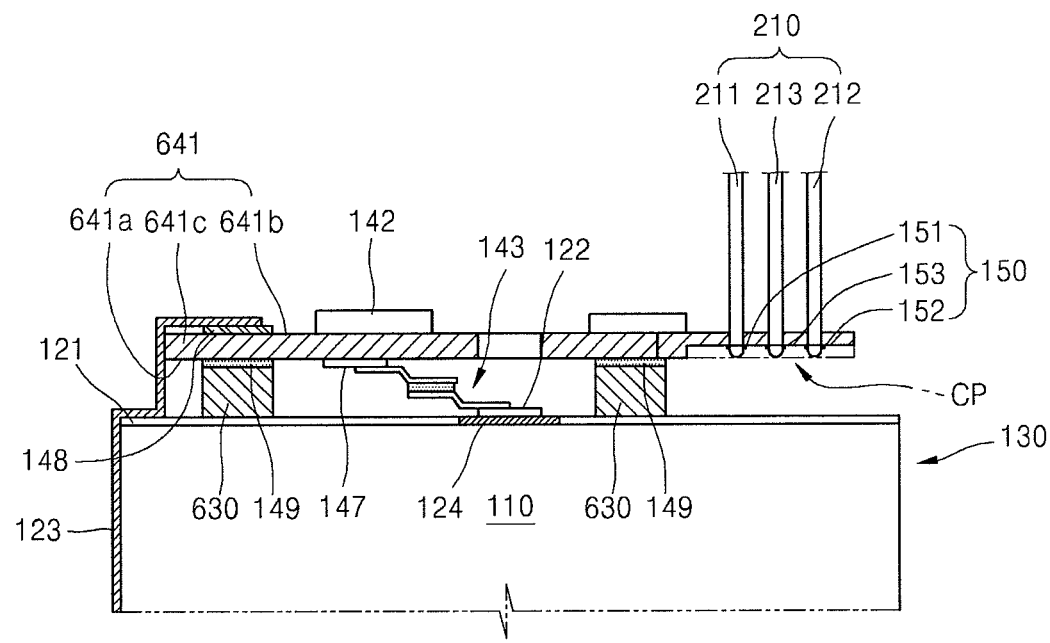
FIG. 6 is a partially cut-away cross-sectional view of a secondary battery pack according to another embodiment of the present invention.

FIG. 6 is a partially cut-away cross-sectional view of a secondary battery pack according to another embodiment of the present invention. Referring to FIG. 6, the wires 210 are connected to the output terminals 150 at a surface 641*a* of a PCB 641 facing the battery cell 130 and drawn toward the other surface 641*b* of the PCB 641 by passing a side wall 641*c* of the PCB 641. While surrounding a part of the PCB 641, the wires 210 are installed to extend upwardly above the other surface 641*b* of the PCB 641.

A plurality of reinforcing blocks 630 are installed between the upper surface of the cap plate 121 and the surface 641*a* of the PCB 641. The reinforcing block 630 secures a space in which the wires 210 are connected to the output terminals 150.

The PCB 641 is partially cut away in a direction along the thickness thereof. The portion where the wires 210 are connected to the output terminals 150 is located within the cut-away area CP of the PCB 641. The cut-away area CP has a size such that the connection portion does not protrude downwardly from the surface 641*a* of the PCB 641 that is not cut away. Accordingly, the size of the secondary battery pack may be further decreased by reducing the installation thickness of the reinforcing block 630. When the size of the secondary battery pack is identical, the capacity of a battery may be increased by increasing the size of the battery cell 130.

Figure 7:
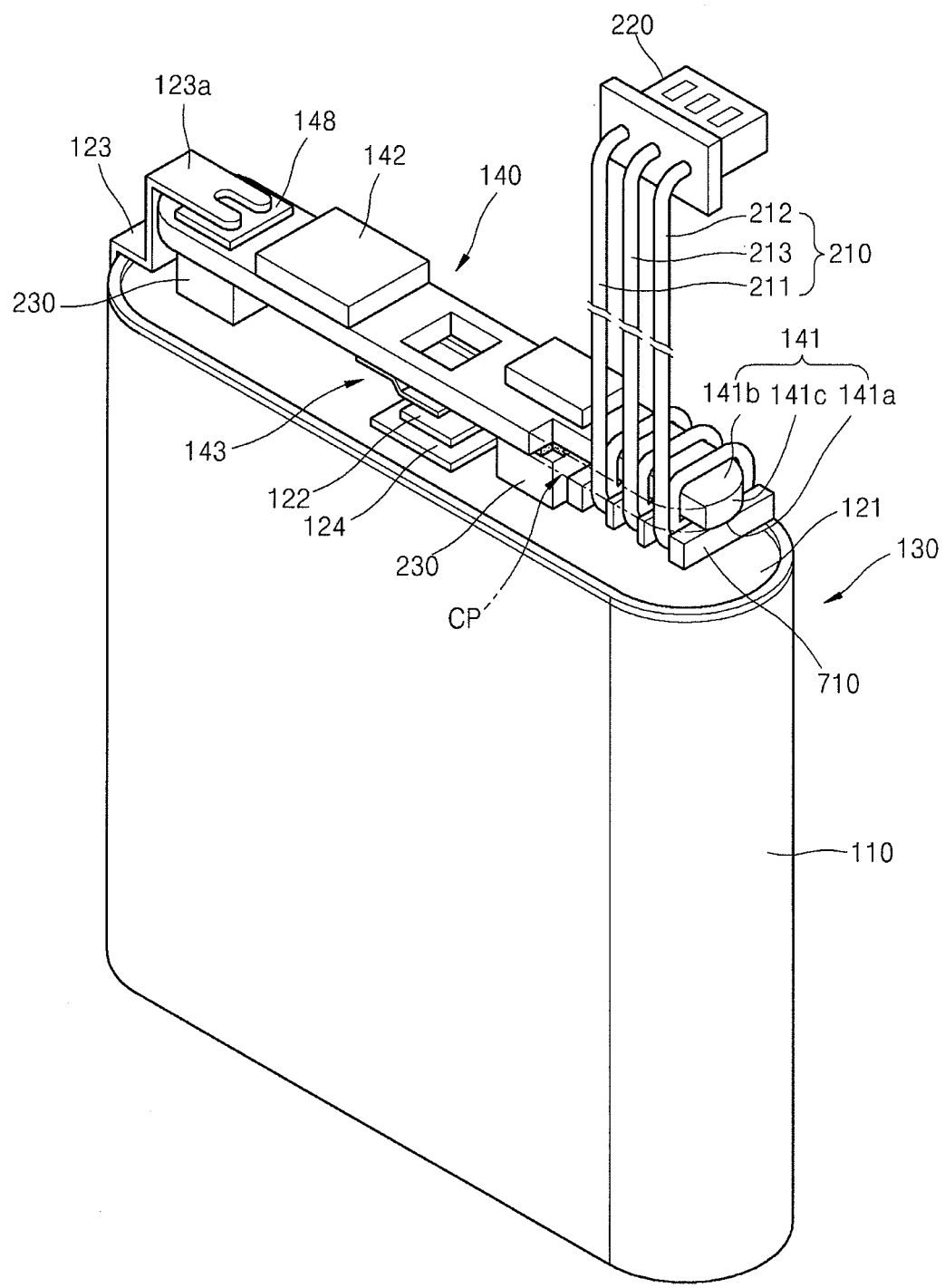
FIG. 7 is a perspective view of a secondary battery pack according to another embodiment of the present invention.

FIG. 7 is a perspective view of a secondary battery pack according to another embodiment of the present invention. Referring to FIG. 7, the wires 210 are connected to the output terminals 150 of FIG. 1 at the surface 141*a* of the PCB 141 facing the battery cell 130. The wires 210 are wound around the PCB 141 at least once. Accordingly, the wires 210 contact both of the surface 141*a* and the other surface 141*b* of the PCB 141.

In addition, the PCB 141 is partially cut away in a portion contacted by the wires 210. The wires 210 are located within the cut-away area CP of the PCB 141. The cut-away area CP may be obtained by cutting one side of the PCB 141 or both sides of the PCB 141 at the same time. The shape of the cut-away area CP is not limited thereto.

Furthermore, a plurality of partition walls 710 for sectioning the wires 210 may be additionally installed in the cut-away area CP in the above-described embodiments. Thus, electric short-circuit between the wires 210 may be prevented.

As described above, according to the secondary battery pack of the present invention, since a plurality of wires electrically connected to the output terminals of a PCB are installed surrounding at least a part of the PCB, the tensile strength of the wires may be improved. Also, to further improve the tensile strength of the wires, the portion where the wires are connected to the output terminals may be further coated using a coating member such as silicon.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery assembly comprising:
   a battery cell having an electrode assembly and a cap assembly wherein the cap assembly includes a cap plate that defines a first surface;
   a protection circuit module having a circuit board which defines a first and a second surface with a side surface interposed there between and at least one protection device mounted on the circuit board; wherein the protection circuit module is mounted on the battery cell so that the first surface of the circuit board of the protection circuit module faces the first surface of the cap plate and wherein the protection circuit module includes at least one external terminal formed on the first surface of the circuit board;
   at least one wire that is comprised of a continuous wire segment that extends away from the battery assembly that is coupled to the at least one external terminal of the protection circuit module so that at least a portion of the at least one wire is positioned interposed between the first surface of the circuit board and the first surface of the cap plate and so that the wire extends downward towards the cap plate in a first direction and then outward in a second direction away from the position interposed between the first surfaces of the circuit board and the cap plate and then extends outward in a third direction away from first surface of the cap plate wherein the first and third directions comprise substantially opposite directions wherein the circuit board of the protection circuit module defines an outer edge of the side surface and wherein a recess is formed in the outer edge so that the at least one wire is positioned next to the side surface of the circuit board within the recess.

2. The assembly of claim 1, wherein the first surface of the circuit board is a bottom surface and wherein an end portion of the at least one wire couples to the external terminal via the bottom surface of the circuit board.

3. The assembly of claim 1, wherein the at least one external terminal comprises a plurality of external terminals and the at least one wire comprises a plurality of wires that respectively couple to the plurality of external terminals.

4. The assembly of claim 1, wherein the depth of the recess is sized so that the at least one wire is positioned within the recess so as to not extend outward from the outer edge of the side surface.

5. The assembly of claim 1, wherein the circuit board of the protection circuit module includes a first and a second end and wherein the external terminal and recess are positioned adjacent a first end.

6. The assembly of claim 1, further comprising at least one reinforcing block that is interposed between the circuit board of the protection circuit module and the first surface of the battery cell.

7. The assembly of claim 6, wherein the at least one reinforcing block comprises a first reinforcing block that engages the circuit board of the protection circuit module at a position adjacent the location where the at least one wire accesses the external terminal via the first surface of the circuit board of the protection circuit module.

8. The assembly of claim 7, further comprising a second reinforcing block that is interposed between the first surface of the battery cell and the first surface of the circuit board of the protection circuit module wherein the circuit board of the protection circuit module defines a first and a second end and the first reinforcing block is positioned adjacent the first end and the second reinforcing block is positioned adjacent the second end.

9. The assembly of claim 1, wherein the portion of the at least one wire that is coupled to the at least one external terminal is coated with a coating material so as to increase the coupling strength between the at least one wire and the at least one external terminal.

10. The assembly of claim 1, wherein the at least one external terminal comprises a first external terminal that is electrically connected to the positive terminal of the battery cell and a second external terminal that is electrically connected to the negative terminal of the battery cell.

* * * * *